(12) United States Patent
Astigeyevich et al.

(10) Patent No.: US 9,086,873 B2
(45) Date of Patent: Jul. 21, 2015

(54) METHODS AND APPARATUS TO COMPILE INSTRUCTIONS FOR A VECTOR OF INSTRUCTION POINTERS PROCESSOR ARCHITECTURE

(71) Applicants: Yevgeniy M. Astigeyevich, Moscow (RU); Dmitry M. Maslennikov, Moscow (RU); Sergey P. Scherbinin, Obninsk (RU); Marat Zakirov, Moscow (RU); Pavel G. Matveyev, Moscow (RU); Andrey Rodchenko, Moscow (RU); Andrey Chudnovets, Moscow (RU); Boris V. Shurygin, Moscow (RU)

(72) Inventors: Yevgeniy M. Astigeyevich, Moscow (RU); Dmitry M. Maslennikov, Moscow (RU); Sergey P. Scherbinin, Obninsk (RU); Marat Zakirov, Moscow (RU); Pavel G. Matveyev, Moscow (RU); Andrey Rodchenko, Moscow (RU); Andrey Chudnovets, Moscow (RU); Boris V. Shurygin, Moscow (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,888

(22) PCT Filed: Mar. 15, 2013

(86) PCT No.: PCT/RU2013/000208
§ 371 (c)(1),
(2) Date: Jun. 19, 2013

(87) PCT Pub. No.: WO2014/142704
PCT Pub. Date: Sep. 18, 2014

(65) Prior Publication Data
US 2014/0281407 A1 Sep. 18, 2014

(51) Int. Cl.
*G06F 9/30* (2006.01)
*G06F 9/45* (2006.01)

(52) U.S. Cl.
CPC .............. *G06F 9/30145* (2013.01); *G06F 8/45* (2013.01); *G06F 8/456* (2013.01)

(58) Field of Classification Search
None
See application file for complete search history.

(56) References Cited

U.S. PATENT DOCUMENTS

| 5,537,561 A | 7/1996 | Nakajima |
| 6,260,189 B1 | 7/2001 | Batten et al. |

(Continued)

FOREIGN PATENT DOCUMENTS

WO 2014142704 9/2014

OTHER PUBLICATIONS

United States Patent and Trademark Office, "Non-Final Office Action", issued in connection with U.S. Appl. No. 13/175,619, dated Sep. 4, 2014 (33 pages).

(Continued)

*Primary Examiner* — Don Wong
*Assistant Examiner* — Reshaun M Finkley
(74) *Attorney, Agent, or Firm* — Hanley, Flight & Zimmerman, LLC

(57) ABSTRACT

Methods, apparatus, systems, and articles of manufacture to compile instructions for a vector of instruction pointers (VIP) processor architecture are disclosed. An example method includes identifying a predicate dependency between a first compiled instruction and a second compiled instruction at a control flow join point, the second compiled instruction having different speculative assumptions corresponding to how the second compiled instruction will be executed based on an outcome of the first compiled instruction. A first strand is organized to execute a first instance of the second compiled instruction corresponding to a first one of the speculative assumptions, and a second strand to execute a second instance of the second compiled instruction corresponding to a second one of the speculative assumptions which is opposite to the first one of the speculative assumptions. The first instance of the second compiled instruction and the second instance of the second compiled instruction are executed in an asynchronous manner relative to each other and to the first compiled instruction.

16 Claims, 11 Drawing Sheets

(56) References Cited

U.S. PATENT DOCUMENTS

| | | | |
|---|---|---|---|
| 6,550,001 B1 | 4/2003 | Corwin et al. | |
| 6,950,927 B1 | 9/2005 | Apisdorf et al. | |
| 7,600,221 B1 | 10/2009 | Rangachari | |
| 8,429,636 B2* | 4/2013 | Chou et al. | 717/158 |
| 8,650,554 B2 | 2/2014 | Elnozahy et al. | |
| 2003/0005266 A1* | 1/2003 | Akkary et al. | 712/220 |
| 2003/0033506 A1 | 2/2003 | Hinds et al. | |
| 2003/0120902 A1 | 6/2003 | Kottapalli et al. | |
| 2003/0126408 A1 | 7/2003 | Vajapeyam et al. | |
| 2004/0073777 A1 | 4/2004 | Arnold et al. | |
| 2005/0251664 A1 | 11/2005 | Caprioli et al. | |
| 2005/0268075 A1 | 12/2005 | Caprioli et al. | |
| 2008/0046698 A1 | 2/2008 | Ahuja et al. | |
| 2008/0209173 A1 | 8/2008 | Evers et al. | |
| 2009/0077360 A1 | 3/2009 | Liu et al. | |
| 2010/0005277 A1* | 1/2010 | Gibert et al. | 712/220 |
| 2010/0274972 A1 | 10/2010 | Babayan et al. | |
| 2010/0332811 A1* | 12/2010 | Wang et al. | 712/237 |
| 2011/0055484 A1* | 3/2011 | Eichenberger et al. | 711/125 |
| 2011/0179254 A1* | 7/2011 | Yip et al. | 712/205 |
| 2013/0007415 A1* | 1/2013 | Babayan et al. | 712/205 |
| 2014/0059328 A1* | 2/2014 | Gonion | 712/222 |

OTHER PUBLICATIONS

International Searching Authority, "International Search Report", issued in connection with International Application No. PCT/US2012/045286, dated Dec. 26, 2012 (3 pages).

United States Patent and Trademark Office, "Final Office Action", issued in connection with U.S. Appl. No. 13/175,619, dated Jan. 28, 2015 (32 pages).

Arroyo and Lee, "Dynamic Simultaneous Multithreaded Architecture", 16th International Conference on Parallel and Distributed Computing Systems, 2003 (pp. 1-8).

Tariq Jamil, "RAM versus CAM", Apr./May 1997, IEEE Xplore (pp. 26-29).

"6.823 Computer System Architecture Scoreboarding for in-order issues", Oct. 27, 2005 (pp. 1-2).

Foldoc, "Foldoc accumlator", Apr. 20, 1999 (pp. 1-3).

Kwok et al., "Static Scheduling Algorithms for Allocating Directed Task Graphs to Multiprocessors", ACM Computing Surveys (CSUR), vol. 31, Issue 4, Dec. 1999 (66 pages).

International Searching Authority, "International Search Report and Written Opinion", issued in connection with International Application No. PCT/RU2013/000208, dated Feb. 17, 2014 (19 pages).

A. Unger et al: "Utilising Parallel Resources by Speculation", Proceedings of the Seventh Euromicro Workshop on Parallel and Distributed Processing, PDP'99, Jan. 1, 1999, pp. 339-346 (8 pages).

James Radigan et al: "Integer Loop Code Generation for VLIW", Aug. 10, 1995, Languages and Compilers for Parallel Computing. 8th. International Workshop, LCPC '95. pp. 318-330, (13 pages).

Neal C Crago et al: "Outrider: Efficient Memory Latency Tolerance with Decoupled Strands", Computer Architecture (ISCA), 2011 38th Annual Internation Symposium on, IEEE, Jun. 4, 2011, pp. 117-128 (12 pages).

L. Wang et al: "On the Boosting of Instruction Scheduling by Renaming", The Journal of Supercomputing, vol. 19, No. 2, Jan. 1, 2001, pp. 173-197, (25 pages).

* cited by examiner

METHODS AND APPARATUS TO COMPILE INSTRUCTIONS FOR A VECTOR OF INSTRUCTION POINTERS PROCESSOR ARCHITECTURE

FIELD OF THE DISCLOSURE

This disclosure relates generally to compilers, and, more particularly, to methods and apparatus to compile instructions for a vector of instruction pointers processor architecture.

BACKGROUND

Computer code is traditionally written in a human-readable language such as C and Java. The human-readable language is a high-level language that it is abstracted from the details of code execution necessary to have a machine implement the code. Machines execute instructions that are in a low-level language, such as assembly language. A compiler translates code written in a high-level language to a low-level language so that it may be executed by the machine. Some compilers translate code written in a first low-level language to a second low-level language. Such compilers may be referred to as binary translators. Different machines having different architectures execute low-level languages having different instruction sets. For example, instructions for a machine having an x86 processor architecture may be different than instructions for a machine having an x64 processor architecture.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
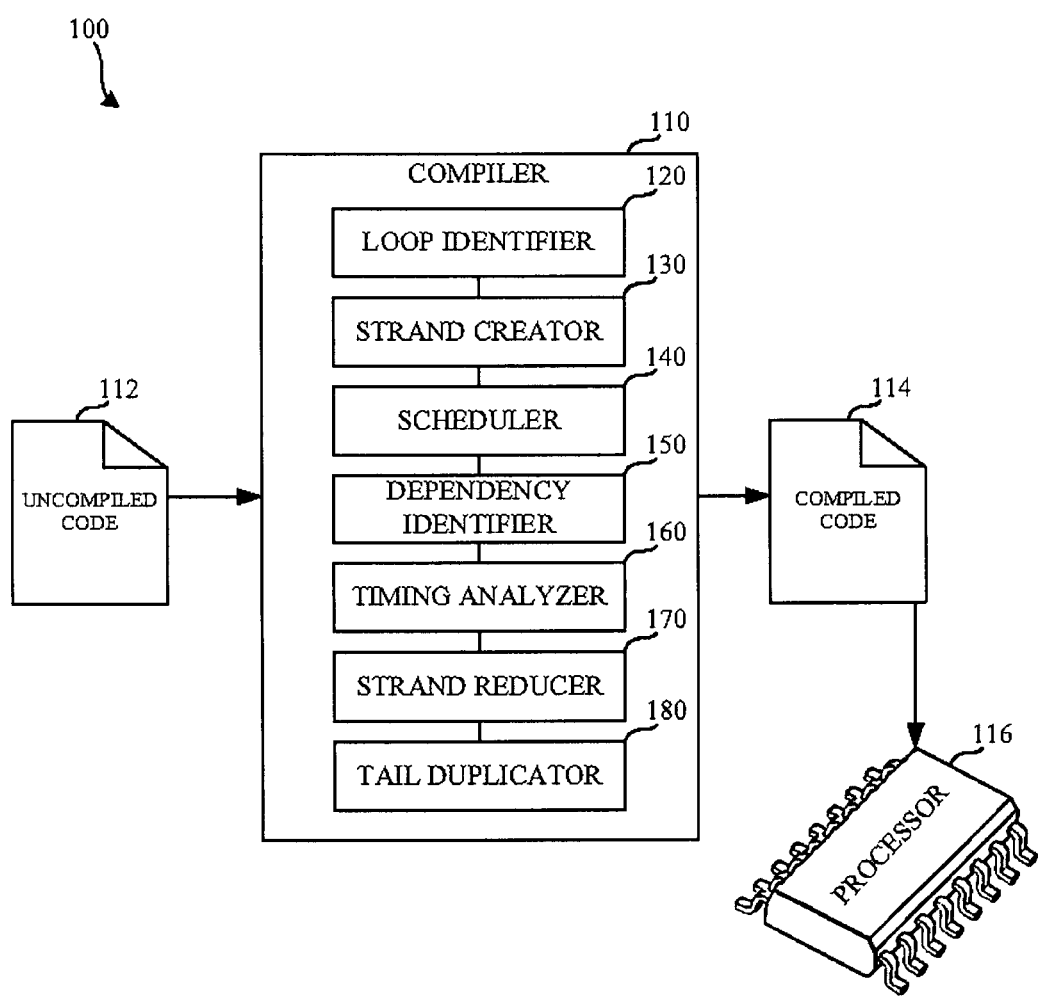
FIG. 1 is a block diagram of an example field of use including an example compiler to compile instructions for a vector of instruction pointers (VIP) processor.

Examples disclosed herein enable compilation of machine-readable instructions for a processor implemented according to a Vector of Instruction Pointers (VIP) architecture. In contrast, scalar processors (which are commonly used in desktop computing systems) operate on a single instruction pointer.

In examples disclosed herein, threads (or sub-processes) are groups of instructions that operate on a same virtual address space. Threads have their own register contexts. Accordingly, threads communicate with each other through memory (e.g., memory locations separate from the register(s) associated with the thread). Threads are implemented at the operating system (OS) level, have a high creation cost, and usually exist for many processor instruction cycles (e.g., one million processor cycles, ten million processor cycles, etc.).

In contrast, strands (which are sometimes referred to as micro-threads) are not implemented at the OS level. However, strands have a common register file, and communicate with each other via the common register file. Strands are created quickly (e.g., a single processor cycle), and typically last for a short period of time (e.g., ten processor cycles, one hundred processor cycles, etc.). Examples disclosed herein apply to strands and, more particularly, to how the strands are compiled by the compiler for use with the VIP processor architecture.

In examples disclosed herein, while selecting instructions from strands to be executed, priority levels of their strands are taken into account. When the compiler of the examples illustrated herein compiles the instructions, the compiler analyzes loops and recurrences within them to recognize criticality of instructions and to set priority levels of their strands accordingly. Setting the strand priority ensures that when a number of ready instructions is bigger than a maximum dynamic scheduling width, a target processor first selects the compiled instructions from the strands having higher priorities.

In examples disclosed herein, the strand(s) are executed by a target processor (e.g., a processor implemented according to the VIP architecture). The target processor includes a number of strand processing units that each can hold a strand. In some examples, each processing unit is referred to as a "way." The number of such ways of the processor limits the number of simultaneously existing strands. That is, if an example processor includes four processing units, a maximum of four strands may be simultaneously exist in the processor. Creation of a new strand while all ways are occupied must wait until at least one of the currently executed strands completes execution or is killed.

The target processor includes a dynamic scheduler which, in each cycle, selects a subset of instructions ready to be executed by execution units from different strands. If the number of ready-to-be-executed instructions is larger than the number of execution units, the dynamic scheduler first selects candidate instructions from strands having larger and/or higher priorities. In examples disclosed herein, the compiler identifies loops and/or recurrences within the loops to recognize the most critical instructions. Any delay in execution of the critical instructions will contribute into overall loop execution time.

Each strand processing unit stores an instruction pointer of a next instruction to be executed in the strand. In examples disclosed herein, strands share data via a common register file. By sharing common memory or register file common data, multiple strands are able to operate on the same data. Sharing a common register file may sometimes cause a race condition where multiple strands operate on the same data.

In some examples, calculations may be speculatively executed to reduce the amount of time required to complete a computation (e.g., to improve efficiency). Speculative execution may occur when, for example, the compiler specifies that a calculation should be executed prior to a time when the calculation is necessary. For instance, a strand can be executed under set of speculative assumptions and killed/ignored if the assumption turns out to be wrong. A simple example of speculative execution is a calculation within an if-else statement. For example, if a value is calculated in two different fashions depending on the evaluation of a predicate for an if-else statement, calculating both of the potential (or speculative) outcomes before evaluating the predicate may be more efficient.

FIG. 1 is a block diagram 100 of an example compiler 110 to compile instructions for an example processor 116. The example compiler 110 receives un-compiled code 112, and compiles to the un-compiled code 112 to create compiled code 114. The example compiled code 114 is executed by the example processor 116.

The un-compiled code 112 of the illustrated example of FIG. 1 is code that is in a high-level and/or human-readable language such as, for example, JAVA, C, C#, Visual Basic, etc. In some examples, the un-compiled code 112 is written in a language other than a human-readable language. For example, the un-compiled code may be written in a machine-readable language. In such an example, the compiler 110 may function as a binary translator that translates machine-readable instructions of a first architecture (e.g., an x86 architecture) for use on different processor architectures (e.g., the VIP architecture). The compiled code 114 of the illustrated example of FIG. 1 is code that is in a low-level and/or machine-readable language such as, for example, machine code, assembly language, etc.

The processor 116 of the illustrated example of FIG. 1 is implemented by a logic circuit, such as a processor implemented according to the VIP architecture, but it could additionally or alternatively be implemented by a microprocessor, an application specific integrated circuit(s) (ASIC(s)), programmable logic device(s) (PLD(s)), field programmable logic device(s) (FPLD(s)), an analog circuit, and/or digital circuitry. In the illustrated example of FIG. 1, the processor 116 is implemented according to the vector of instruction pointers (VIP) architecture. The processor 116 includes four strand processing units that each can hold a strand. However, any number of strand processing units may additionally or alternatively be used. For example, the processor 116 may include eight strand processing units, thirty-two strand processing units, sixty-four strand processing units, etc. As described above, in some examples, each strand processing unit is referred to as a "way," and the number of strand processing units of the processor 116 limits the number of simultaneously existing strands. That is, the example processor 116, which includes four strand processing units, can simultaneously hold four strands. Creation of new strands while all strand processing units are occupied, waits until at least one currently executed strand completes execution or is killed (e.g., until a strand processing unit is available). The amount of simultaneously executing instructions from the strands is limited by a total number of execution units.

The example compiler 110 of the illustrated example of FIG. 1 includes a loop identifier 120, a strand creator 130, a scheduler 140, a dependency identifier 150, a timing analyzer 160, a strand reducer 170, and a tail duplicator 180.

The example loop identifier 120 of the illustrated example of FIG. 1 is implemented by a processor executing instructions, but it could alternatively be implemented by an ASIC, DSP, FPGA, or other circuitry. The example loop identifier 120 identifies loops and/or recurrences within the un-compiled code 112 and/or within the compiled code 114. Loops having calculations that take a long time to execute increase the execution time of the loop. For example, if a loop is to be executed ten times, each execution of the loop is performed serially. As a result, the total execution time of the loop is ten times longer than the execution time of a single loop iteration execution. However, not all calculations within the current loop iteration necessarily depend on a previous loop iteration. Accordingly, each loop iteration may be put into a separate strand for execution by the example processor 116. Because multiple strands may be executed at the same time, the total execution time of the loop may be significantly reduced.

The example strand creator 130 of the illustrated example of FIG. 1 is implemented by a processor executing instructions, but it could alternatively be implemented by an ASIC, DSP, FPGA, or other circuitry. The example strand creator 130 creates strands within the compiled code 114 to be executed by the processor 116. In the illustrated example of FIG. 1, the strand creator 130 creates a number of strands that can be executed by the processor 116. For example, if the processor 116 includes four strand processing units, the example strand creator 130 can create up to four strands that can exist simultaneously. However, in some cases, the strand creator 130 may create more strands than can be simultaneously executed by the execution units of the processor 116 at each cycle.

The example scheduler 140 of the illustrated example of FIG. 1 is implemented by a processor executing instructions, but it could alternatively be implemented by an ASIC, DSP, FPGA, or other circuitry. The example scheduler 140 identifies criticality of instructions and sets priorities of corresponding strands to be executed by the processor 116. For example, the scheduler 140 may recognize that one strand should have a higher execution priority than another strand. In the illustrated example of FIG. 1, the scheduler 140 may assign a priority value to each strand to be executed by the processor 116. However, the example scheduler 140 does not necessarily assign a priority value to each strand (e.g., some strands may be assigned a default value while being created). When the processor 116 executes the instructions and a number of ready instructions is bigger than a maximum dynamic scheduling width, strand priorities set by the scheduler 140 are taken into account to identify instructions to be selected first.

The example dependency identifier 150 of the illustrated example of FIG. 1 is implemented by a processor executing instructions, but it could alternatively be implemented by an ASIC, DSP, FPGA, or other circuitry. The example dependency identifier 150 of FIG. 1 identifies dependencies in loops identified by the loop identifier 120. Loops having calculations that take a long time (e.g., many processor cycles) to execute increase the amount of execution time of the loop. However, the calculations performed in one iteration of a loop may depend on calculations performed in one or more previous iterations of the loop. Accordingly, the iterations of the loop cannot be performed in parallel because of the data dependency on the previous iteration. However, the dependency does not necessarily mean that the loop must be executed serially. For example, the loop may be implemented in a cascading fashion where, for example, a second iteration of the loop begins after a dependency from the first iteration of the loop is satisfied.

The example timing analyzer 160 of the illustrated example of FIG. 1 is implemented by a processor executing instructions, but it could alternatively be implemented by an ASIC, DSP, FPGA, or other circuitry. The example timing analyzer 160 analyzes execution times based on dependencies between instructions and/or resources of the example processor 116. The timing analysis performed by the example timing analyzer 160 enables the example strand reducer 170 to combine multiple strands (that are dependent on another strand) into a single strand.

The strand reducer 170 of the illustrated example of FIG. 1 is implemented by a processor executing instructions, but it could alternatively be implemented by an ASIC, DSP, FPGA, or other circuitry. The example strand reducer 170 combines multiple strands into a single strand. The example processor 116 includes a finite number of processing units which execute a finite number of strands at a single time. Accordingly, if too many strands are generated, the processor 116 may not execute those strands due to a limited number of execution units. In some examples reducing the amount of strands created by the compiler 110 decreases the total execution time of the compiled code 114.

The example tail duplicator 180 of the illustrated example of FIG. 1 is implemented by a processor executing instructions, but it could alternatively be implemented by an ASIC, DSP, FPGA, or other circuitry. The example tail duplicator 180 enables speculation of calculations performed within the compiled code 114. The example tail duplicator 180 causes speculative code to be split into multiple strands (tails) that include instructions that store calculation results in a register of the processor 116. The location of the register is dynamically calculated using a basing value. That is, the register location is "based" on the basing value. The example tail duplicator 180 uses register basing because different dynamic copies of static instructions executed in different speculative strands need different physical register numbers to store computed information. If, for example, different dynamic copies of static instructions did not include register basing, there may be a race condition where both dynamic copies of static instructions write to the same register location which will lead to incorrect execution. In examples disclosed herein, the scheduler 140 (which assigns priorities to strands) is aware of the final state of the strands as modified by the strand reducer 170. Furthermore, the strand creator 130 is aware of the dependencies identified by the dependency identifier 150. The dependency between the timing analyzer 160 and the strand creator 130, in some examples, results in a situation where the strand reducer 170 is not necessary.

Figure 4:
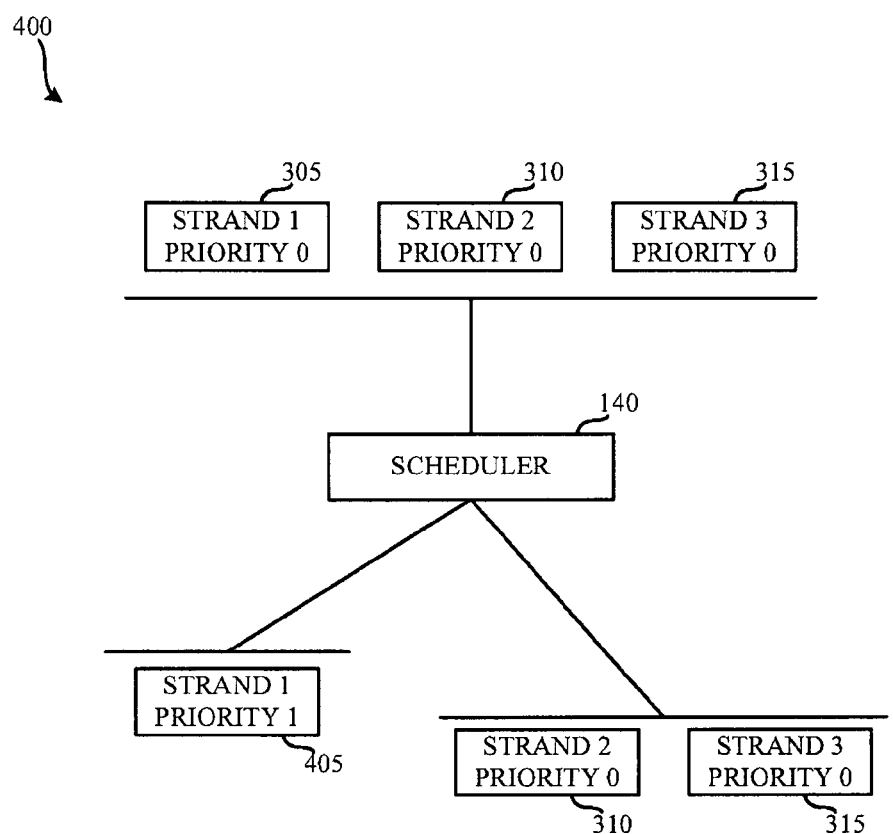
FIG. 4 illustrates assignment of strand priorities by the scheduler of FIG. 1.

While an example manner of implementing the compiler 110 of FIG. 1 is illustrated in FIG. 1, one or more of the elements, processes and/or devices illustrated in FIG. 4 may be combined, divided, re-arranged, omitted, eliminated and/or implemented in any other way. Further, the example loop identifier 120, the example strand creator 130, the example scheduler 140, the example dependency identifier 150, the example timing analyzer 160, the example strand reducer 170, the example tail duplicator 180, and/or, more generally, the example compiler 110 of FIG. 1 may be implemented by hardware, software, firmware and/or any combination of hardware, software and/or firmware. Thus, for example, any of the example loop identifier 120, the example strand creator 130, the example scheduler 140, the example dependency identifier 150, the example timing analyzer 160, the example strand reducer 170, the example tail duplicator 180, and/or, more generally, the example compiler 110 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example loop identifier 120, the example strand creator 130, the example scheduler 140, the example dependency identifier 150, the example timing analyzer 160, the example strand reducer 170, and/or the example tail duplicator 180 are hereby expressly defined to include a tangible computer readable storage device or storage disc such as a memory, DVD, CD, Blu-ray, etc. storing the software and/or firmware. Further still, the example compiler 110 of FIG. 1 may include one or more elements, processes and/or devices in addition to, or instead of, those illustrated in FIG. 1, and/or may include more than one of any or all of the illustrated elements, processes and devices.

Figure 5:
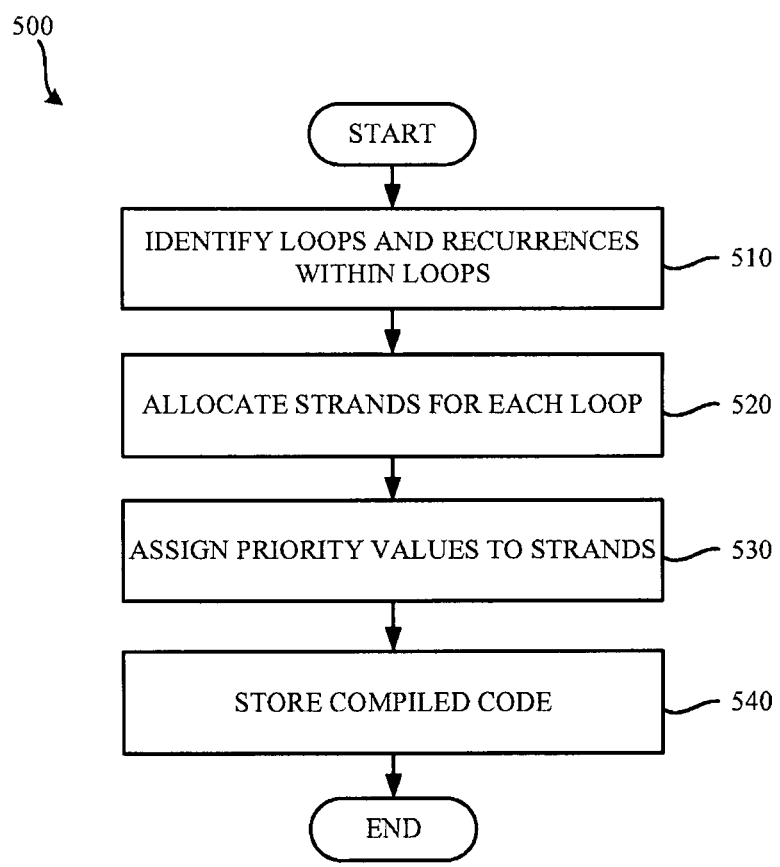
FIG. 5 is a flowchart representative of example machine-readable instructions that may be executed to implement the example compiler of FIG. 1.
Figure 10:
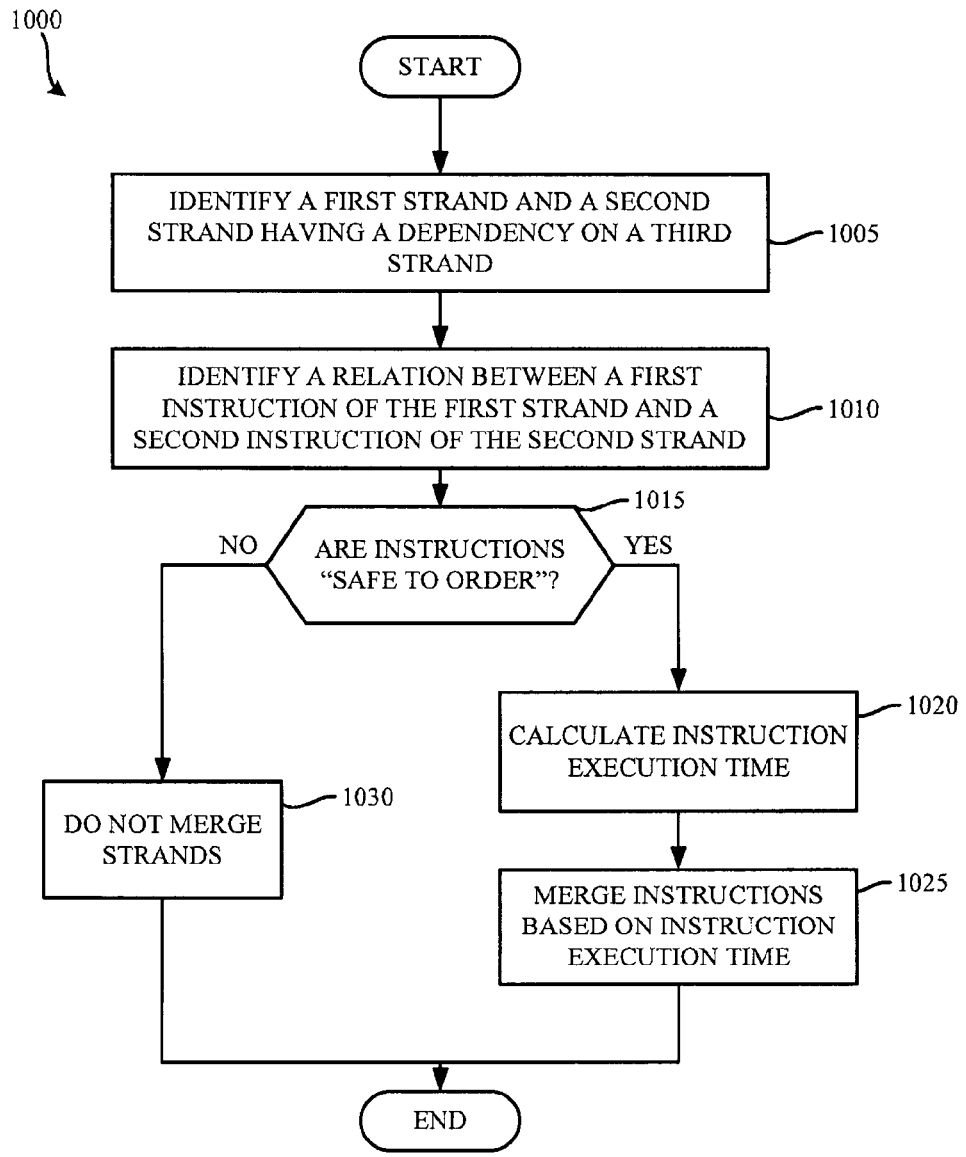
FIG. 10 is a flowchart representative of example machine-readable instructions that may be executed to implement the example compiler of FIG. 1.

Flowcharts representative of example machine readable instructions for implementing the example compiler 110 of FIG. 1 are shown in FIGS. 5, 10, and/or 13. In these examples, the machine readable instructions comprise a program(s) for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIG. 1, many other methods of implementing the example compiler 110 may alternatively be used. For example, the order of execution of the blocks may be changed, and/or some of the blocks described may be changed, eliminated, or combined.

As mentioned above, the example processes of FIGS. 5, 10, and/or 13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 5, 10, and/or 13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

Set a Priority Level for Each Generated Strand

In some examples, multiple strands may be created by the compiler 110. In such examples, the processor 116 may not be able to execute, in one cycle, ready instructions (e.g., instructions that are ready to be executed) from all strands due to limits of a dynamic scheduling width. The processor 116 has a dynamic scheduler which selects a subset of ready instructions from different strands in each cycle. In examples disclosed herein, there may be some critical instructions identified by the compiler (e.g., instructions which are part of recurrences of loops). Any delay in execution of such critical instructions may contribute to overall loop execution time. In examples disclosed herein, strand prioritization is used to ensure that a target processor (e.g., the processor 116) selects critical instructions first. For example, the scheduler 140 may set a priority level for a strand consisting of critical instructions indicating a priority for execution of instructions. The processor 116 selects ready instructions from strands to be executed based on the strand priority level set by the scheduler 140.

The approach disclosed herein does not apply to super scalar architectures and/or very long instruction word (VLIW) architectures. The approach disclosed herein does not apply to superscalar architectures because superscalar architectures use dynamic scheduling to find critical instructions and execute them first. That is, superscalar architectures do not analyze a loop in whole. Instead, superscalar architectures perform a local analysis of the currently executed loop code. Furthermore, the approach disclosed herein does not apply to the VLIW architecture because the VLIW architecture statically assigns instructions to execution units (e.g., has no dynamic scheduler).

The examples disclosed herein apply to compiled code generated for VIP processors asynchronously executing multiple strands. By separating code into separate strands, the VIP processor 116 may be utilized more efficiently because instructions are executed in parallel.

Figures 2, 3:
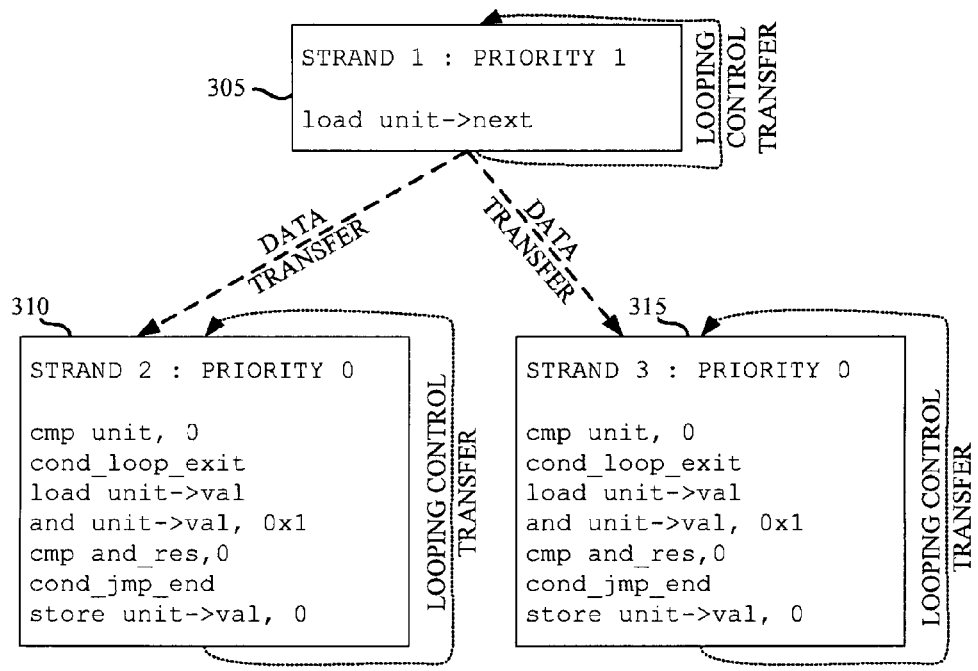
FIG. 2 describes example high-level un-compiled code that may be compiled by the compiler of FIG. 1.
FIG. 3 describes example low-level compiled code that may be executed by the processor of FIG. 1.

FIG. 2 describes example high-level un-compiled code 200 that may be compiled by the compiler 110 of FIG. 1. In the illustrated example of FIG. 2 the un-compiled code 200 includes a for-loop with a calculation performed in each iteration. In the illustrated example of FIG. 2, there are iteration dependent calculations (e.g., "unit=unit→next") and iteration independent calculations. The iteration independent calculations can be put into strands executing separate iterations of the loop.

FIG. 3 describes example low-level compiled code that may be executed by the processor 116. In the illustrated example of FIG. 3, three strands 305, 310, 315 are shown. However, any other number of strands may additionally or alternatively be used. In the illustrated example, the first strand 305 executes every iteration of the loop of the un-compiled code 200. The second strand 310 executes a first iteration, a third iteration, a fifth iteration, and so on of the for-loop of the un-compiled code 200. The third strand 315 executes a zero iteration, a second iteration, a fourth iteration, and so on of the for-loop of the un-compiled code 200. That is, the first strand 305 contains instructions which compute data critical for parallel execution of the second strand 310 and the third strand 315. In some examples, instructions from strand 305, strand 310 and strand 315 are ready to be executed, but a dynamic scheduler can select only two of them due to limits of dynamic scheduling width. While the example uses a dynamic scheduling width of two instructions, the dynamic scheduling width can be larger. Not selecting an instruction of strand 305 may delay computation of critical data used by the second strand 310 and the third strand 315 and may increase overall loop execution time.

To prevent slowed execution of the strands by the processor 116, the scheduler 140 sets a priority level of strands having critical instructions different from the default priority level (e.g., a raised and/or heightened priority level). In the illustrated example, the scheduler 140 identifies that the first strand 305 should have a higher execution priority than the second strand 310 and the third strand 315. Accordingly, when the processor 116 selects the ready instructions of the strands to be executed and the limits of the dynamic scheduling width are reached, the instructions of the strand 305 are selected first because of the raised/heightened priority.

FIG. 4 illustrates assignment of strand priorities by the scheduler 140 of FIG. 1. In the illustrated example of FIG. 4, the scheduler 140 evaluates dependencies among the strands 305, 310, 315 and sets a higher priority for the first strand 305 to form a higher priority first strand 405. While the example strands of FIG. 4 are prioritized using an integer, the strands may be prioritized in any other fashion such as, for example, prioritized using a decimal notation, a character, a string, etc. In the illustrated example of FIG. 4, the second strand 310 and the third strand 315 are not modified by the scheduler and remain at a default priority level. In the illustrated example of FIG. 4, an integer zero is used as the default priority. However, the default priority level may be defined in any other fashion such as, for example, zero using a different number representation, a special non-zero value, an absence of an explicitly specified priority level, etc.

FIG. 5 is a flowchart representative of example machine-readable instructions 500 that may be executed to implement the example compiler 110 of FIG. 1. The example process 500 of the illustrated example of FIG. 5 begins when the compiler 110 begins compiling the un-compiled code 112 of FIG. 1. The loop identifier 120 identifies loops and recurrences within loops in the un-compiled code (block 510). In some examples, the loop identifier 120 identifies loops in the un-compiled code 112 by inspecting the code for known loop structures (e.g., a for loop, a while loop, etc.) and/or recurrences. However, any other way of identifying a loop may additionally or alternatively be used. The example strand creator 130 then allocates strands for each identified loop (block 520). In the illustrated example, strands are created that include compiled code for execution by the processor 116. The example scheduler 140 then generates and assigns a priority value for strands having critical operations (block 530). The priority value of the illustrated example is an integer value. However, any other type of priority value may additionally or alternatively be used. In the illustrated example, priority values are set in a header of the compiled code associated with each strand. For example, in the illustrated example of FIG. 3, the priority level of the first strand 305 is set to one, while the priority level of the second strand 310 and strand 315 remain the default. The strand creator 130 then stores the compiled code (block 540). The compiled code may be stored on a memory device such as, for example, a hard drive, a USB flash drive, a CD-ROM, etc. The compiled code may then be executed by the example processor 116.

Reduce the Total Number of Generated Strands

In examples disclosed herein, the processor 116 includes a finite number of processing units. Each processing unit is capable of processing one strand at a time. If, for example, there are more strands than processing units, the example processor 116 will not be able to execute all strands simultaneously. The unexecuted strands must wait until executed strands are completed. In some examples, this dependency upon the completion of other strands adds additional execution time, when compared with execution times of a processor that has enough available processing units.

To overcome strand processing unit limitations of the example processor 116, the example compiler 110 merges strands to reduce the overall execution time. In examples disclosed herein, the compiler 110 uses a timing analysis to arrange instructions. As disclosed further herein, the timing analysis allows for scheduling of instructions that would otherwise be executed in separate strands into a single strand without the risk of introducing additional dependencies that negatively affect execution time.

Instructions that are the dependent on another instruction cannot be executed in parallel with the instruction that they depend on. Accordingly, scheduling the dependent instructions into different strands does not increase the degree of parallelism in executing the instructions. Conversely, if two independent instructions are scheduled into a single strand, the in order execution introduces a new dependency between the independent instructions. Accordingly, the example compiler 110 avoids scheduling independent instructions in a single strand. That is, the example compiler 110 merges strands according to pre-existing dependencies on other strands.

While examples are disclosed herein with respect to forming strands according to dependences between instructions and then performing a timing analysis to merge the instructions, any other approach may additionally or alternatively be taken. For example, strands may be formed using the results of timing analysis without being combined. The difference in the resulting code generated by the compiler is that not only two instructions from different strands can end up in one strand but that two dependent instructions can be in different strands if there is a more efficient way to generate the strand according to the information collected by the timing analyzer 160. In some examples, the results of strand generation with and without timing information can be drastically different.

Further, while in examples disclosed herein the timing analyzer 160 identifies whether two instructions are "safe to order", any other technique for determining whether the instructions are "safe to order" may additionally or alternatively be used. In some examples, the "safe to order" indication may be based on whether two instructions (while possibly delaying one of the instructions), when re-ordered, do not change the execution time and/or the critical path of the program. That is, some operations (e.g., instructions) are critical, while others are not. Most importantly, the likelihood of resource conflicts (e.g., where there are more strands than available processing units) can be reduced by the addition of dependencies between instructions (e.g., merging the instructions into a same strand), while not increasing the overall execution time of the program.

Figure 6:
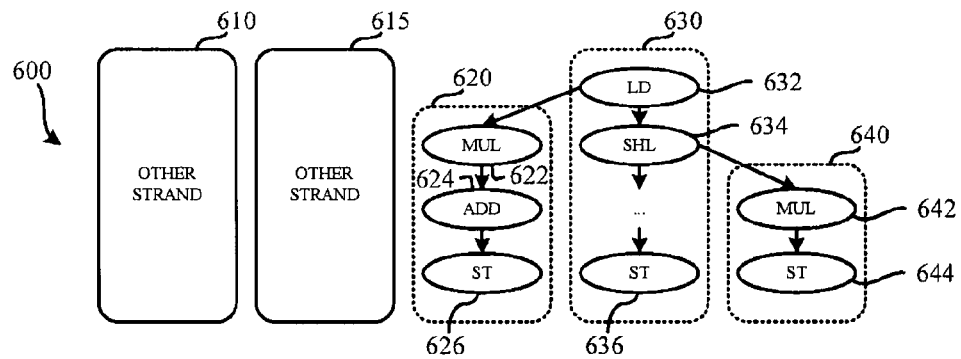
FIG. 6 illustrates strands to be executed by the processor of FIG. 1.

FIG. 6 illustrates strands to be executed by the processor 116 of FIG. 1. The illustrated example of FIG. 6 includes five strands 610, 615, 620, 630, 640. The first "other" strand 610 and the second "other" strand 615 are strands that are executed by the processor 116 and are not directly associated with the first strand 620, the second strand 630, or the third strand 640. In some examples, the first other strand 610 and the second strand 615 may be part of the same executable as the first strand 620, the second strand 630, and/or the third strand 640. In the illustrated example of FIG. 6, the processor 116 includes four processing units and, accordingly, can simultaneously execute four of the five strands shown in FIG. 6. The example strands 610, 615, 620, 630, 640 represent compiled strands ready for execution by the example processor 116.

The first example strand 620 includes a first instruction 622, a second instruction 624, and a third instruction 626. While the example first strand 620 includes three instructions, any other number and/or types of instructions may additionally or alternatively be used.

In the illustrated example of FIG. 6, the second strand 630 includes a fourth instruction 632, a fifth instruction 634, and a sixth instruction 636. While in the illustrated example, the second strand 630 includes three instructions, any other number and/or types of instructions may additionally or alternatively be used. The example third strand 640 includes a seventh instruction 642 and an eighth instruction 644. While the example third strand 640 includes two instructions, any other number and/or types of instructions may additionally or alternatively be used.

In the illustrated example of FIG. 6, the first instruction 622 of the first strand 620 is dependent upon the fourth instruction 632 of the second strand 630. That is, the first instruction 622 may not begin execution until the fourth instruction 632 has completed execution. Furthermore, the seventh instruction 642 of the third strand 640 is dependent upon the fifth instruction 634 of the second strand 630. In a similar fashion, the seventh instruction 642 may not begin execution until the fourth instruction 632 has completed execution.

Figure 7:
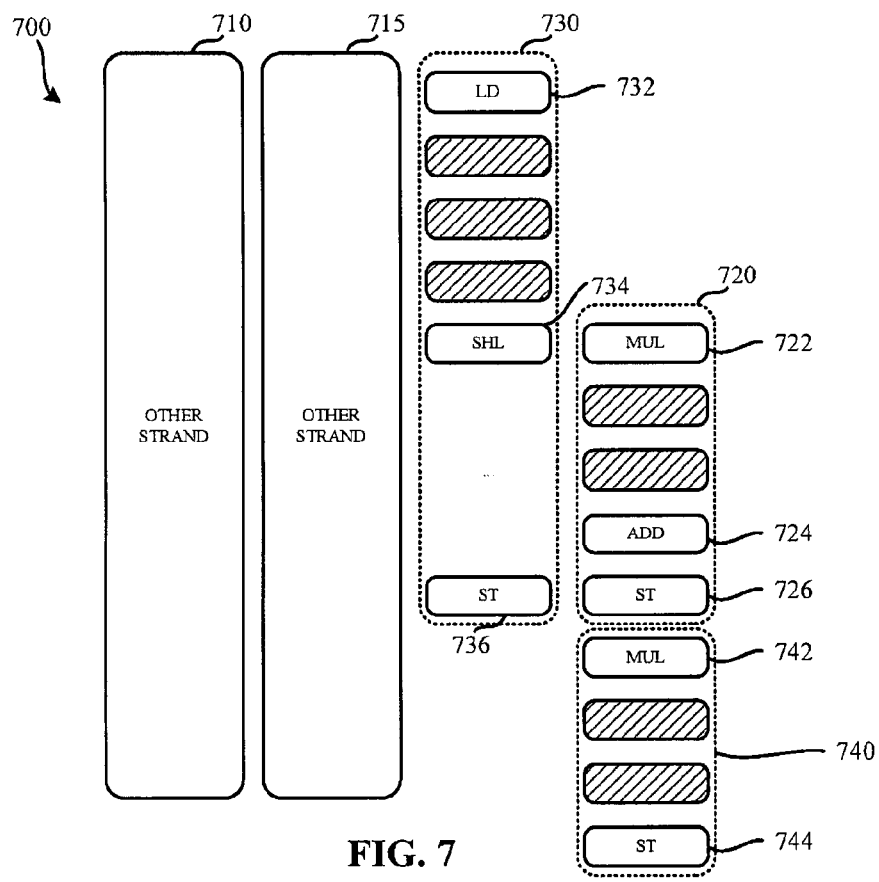
FIG. 7 is an example timing diagram of execution of the strands of FIG. 6 by the processor of FIG. 1.

FIG. 7 is an example timing diagram 700 of execution of the strands of FIG. 6 by the processor 116 of FIG. 1. In the illustrated example of FIG. 7, the processor 116 executes four strands simultaneously. That is, the processor 116 executes the first other strand 710 corresponding to the first other strand 610 of FIG. 6, the second other strand 715 corresponding to the second other strand 615 of FIG. 6, and a second strand 730 corresponding to the second strand 630 of FIG. 6. In the illustrated example of FIG. 7, a first strand 720 corresponding to the first strand 620 of FIG. 6 does not begin execution until its dependencies are satisfied. A third example strand 740 corresponding to the third strand 640 FIG. 6 does not begin execution until the first strand 720 has completed execution. That is, the third strand 740 is stalled because of the lack of available processing units. In some examples, the first strand 720 and/or the third strand 740 may be executed in any order because they have a matching priority level.

In the illustrated example of FIG. 7, the first strand 720 includes three instructions to be executed by the processor 106. The first strand 720 includes a first instruction 722, a second instruction 724, and a third instruction 726. The example second strand 730 includes three instructions to be executed by the processor 116, a fourth instruction 732, a fifth instruction 734, and a sixth instruction 736. The example third strand 740 includes a seventh instruction 742, and an eighth instruction 744. While eight instructions are shown in the illustrated example of FIG. 7, any number and/or types of instructions may additionally or alternatively be used.

In the illustrated example of FIG. 7, the first instruction 722 and the seventh instruction 742 are multiply instructions (MUL). The example multiply instructions are executed over a period of three clock cycles by the processor 116. The example second instruction 724 is an add instruction (ADD). The example add instruction is executed over a period of one clock cycle by the processor 116. The example third instruction 726, the example sixth instruction 736, and the example eighth instruction 744 are store instructions (ST). The example store instructions are executed over a period of one clock cycle by the processor 116. The example fourth instruction 732 is a load instruction (LD), which is executed over a period of four clock cycles by the processor 116. The example fifth instruction 734 is a shift left instruction (SHL), which is executed over a period of one clock cycle by the processor 116. However, any other instructions having any other execution duration may additionally or alternatively be used.

Figure 8:
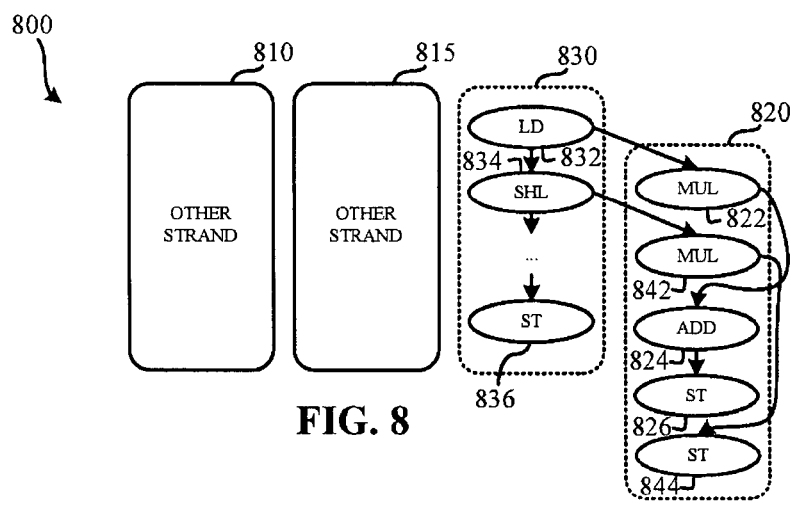
FIG. 8 illustrates strands to be executed by the processor of FIG. 1.

FIG. 8 illustrates strands to be executed by the processor 116 of FIG. 1. The illustrated example of FIG. 8 includes four strands 810, 815, 820, 830. The first other strand 810 in the second other strand 815 are strands are executed by the processor, and are not directly associated with the first strand 820 and/or the second strand 830. In the illustrated example, the first strand 820 corresponds to a combined version of the first strand 620 and the third strand 640 of FIG. 6. In the illustrated example of FIG. 8, the compiler 110 combines multiple strands so that they are executed as a single strand. Such combination enables the executed strand to be completed and a shorter duration than if the strands were executed separate from each other.

In the illustrated example of FIG. 8, the first strand 820 includes five instructions to be executed by the processor 106. The first strand 820 includes a first instruction 822, a second instruction 824, and a third instruction 826. The first instruction 822 of the first strand 820 is dependent upon a fourth instruction 832 of the second strand 830. The second strand 830 includes the fourth instruction 832, a fifth instruction 834, and a sixth instruction 836. The first strand 820 further includes a seventh instruction 842, and an eighth instruction 844. The seventh instruction 842 of the example first strand 820 is dependent upon the fifth instruction 834 of the second strand 830.

Figure 9:
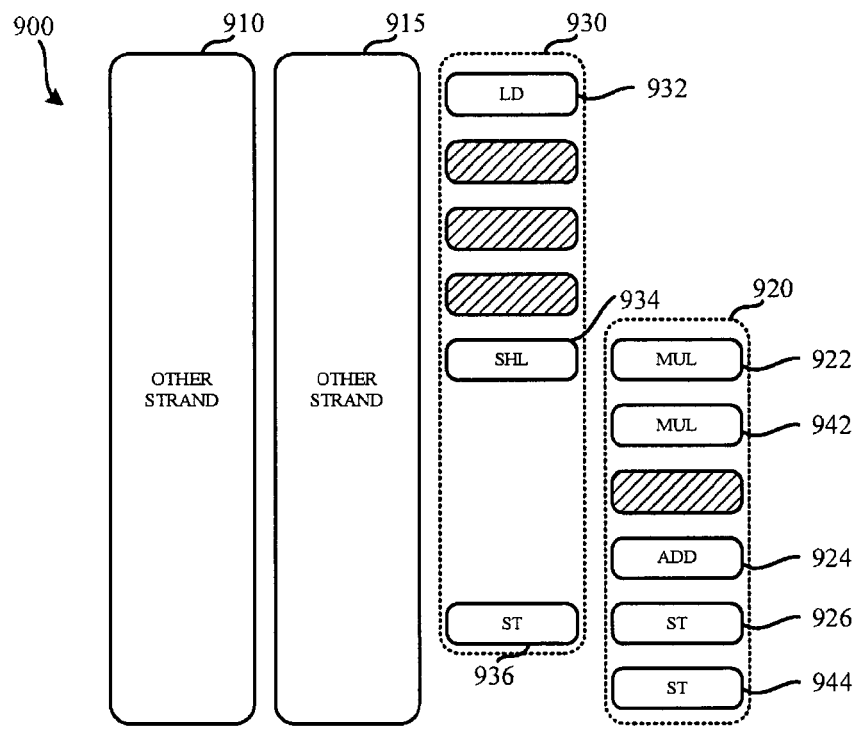
FIG. 9 is an example timing diagram of execution of the strands of FIG. 8 by the processor of FIG. 1.

FIG. 9 is an example timing diagram 900 of execution of the strands of FIG. 8 by the processor 116 of FIG. 1. In the illustrated example of FIG. 9, the processor 116 executes the four strands simultaneously. The example timing diagram 900 includes a first other strand 910 corresponding to the first other strand 810 FIG. 8, a second other strand 915 corresponding to the second other strand 815 of FIG. 8, a first strand 920 corresponding to the first strand 820 FIG. 8, and a second strand 930 corresponding to the second strand 830 of FIG. 8.

The example first and second strands 920, 930 include a first instruction 922 a second instruction 924, a third instruction 926, a fourth instruction 932, a fifth instruction 934, a sixth instruction 936, a seventh instruction 942, and an eighth instruction 944 that correspond respectively to the instructions 822, 824, 826, 832, 834, 836, 842, 844 of FIG. 8. In the illustrated example of FIG. 9, the first instruction 922 and the seventh instruction 942 are multiply instructions. The example multiply instructions are overlapped in execution. The example multiply instructions 922, 942 are executed using instruction level parallelism (ILP), and enable the processor 116 to complete execution in a shorter duration than if the multiply instructions 922, 942 were not overlapped.

FIG. 10 is a flowchart representative of example machine-readable instructions 1000 that may be executed to implement the example compiler 110 of FIG. 1. The example process 1000 of the illustrated example of FIG. 10 begins when the compiler 110 begins compiling the un-compiled code 112 of FIG. 1. The dependency identifier 150 identifies a first strand and a second strand having a dependency on a third strand (block 1005). With respect to the illustrated example of FIG. 6, the dependency identifier 150 identifies that the first instruction 622 of the first strand 620 is dependent upon the fourth instruction 632 of the second strand 630. Further, the example dependency identifier 150 identifies that the seventh instruction 642 is dependent upon the fifth instruction 634 of the second strand 630. In the illustrated example, the dependency identifier 150 identifies multiple strands that depend on one strand.

The strand reducer 170 then identifies a relation between a first instruction of the first strand and a second instruction of the second strand (block 1010). For example, with respect to the example of FIG. 6, the example strand reducer 170 identifies a relationship between the first instruction 622 and the seventh instruction 642. In the illustrated example, the strand reducer 170 determines that the first instruction 622 and the seventh instruction 642 are safe to order. The safe to order relationship identifies that if the instructions were to be placed in a single strand, artificial dependence created between them does not affect critical path and execution time. Alternatively, the strand reducer 170 may identify that the relationship between the first instruction 622 and the seventh instruction 642 is unknown. If the relationship is unknown, the strand should not be combined because a dependency between such instructions may increase critical path and/or execution time.

The strand reducer 170 determines if the instructions are safe to order (block 1015). If the instructions are not safe to order, the strand reducer 170 does not merge the strands (block 1030) in the compilation process terminates.

If the instructions are safe to order (block 1015), the timing analyzer 160 calculates instruction execution times for the instructions in the strands to be combined (block 1020). Referring to the illustrated example of FIG. 8, the first instruction 822 and the seventh instruction 842 have a dependency that is separated by the execution of the fifth instruction 834. Accordingly, the timing analyzer 160 determines that the first instruction 822 and the seventh instruction 842 must be separated by at least one clock cycle, corresponding to the one clock cycle required for executing the fifth instruction 834. In the illustrated example, the fifth instruction 834 has a constant execution delay of one clock cycle. However, some instructions may have a variable execution delay. The timing analyzer 160 estimates the variable execution delay and selects an appropriate delay when arranging the instructions of the combined strands.

In the illustrated example, the strand reducer 170 merges each instruction of the strands to be combined into the combined strand. Accordingly, the timing analysis performed by the timing analyzer 160 makes every pair of instructions comparable if they are not disjoint by control logic (e.g., a dependency on a prior instruction). In examples disclosed herein, the timing analyzer 160 provides either a precise timing estimate based on the clock cycles to execute a given instruction, and/or a conservative answer of unknown if a precise timing estimate cannot be calculated (e.g., the instruction has a variable execution time).

Based on the timing analysis performed by the timing analyzer 160, the example strand reducer 170 merges each instruction of the strands to be merged into a combined strand (block 1025). In some examples, the strand reducer 170 uses instruction level parallelism (ILP) to reduce the number of clock cycles required to complete execution of the combined strand. The combined strand may then be executed by the processor 116.

Dynamic Speculative Tail Duplication Accompanied by Dynamic Calculation of Effective Register Location In examples disclosed herein, the processor 116 asynchronously executes multiple strands that communicate with each other (e.g., share data) via a register. In some examples, the processor 116 speculatively executes strands to achieve a shorter execution time by overlapping calculation of predicate and speculative execution of instructions depending on the predicate. Speculative execution may result in additional computations that, in the end, may be unnecessary.

In examples disclosed herein, the processor 116 includes one or more processing units that respectively execute one or more strands. Each processing unit has access to a shared memory space (e.g., a register, a common register file, etc.). However, when multiple processing units operate on the same data in the shared memory space, a race condition may occur, potentially causing data corruption. This race condition is experienced at a control flow join point, where one or more strands are rejoined. Such a control flow join point creates two issues with respect to the examples disclosed herein. First, instructions that are to be executed after the join point must obtain a value from different producers (e.g., strands) depending on evaluation of a predicate (e.g., a predicate dependency). The instructions must wait on execution of the predicate to know which value should be used. That is, the instructions have a predicate dependency. Furthermore, two or more instructions producing the value used after the join point cannot be executed speculatively because they both will write to the same register, creating a race condition. Accordingly, the instructions (e.g., strands) generating the value must also wait for the predicate.

Some known systems eliminate the control flow join point by copying instructions after the join point into strands calculating the value. Such a procedure is known as Static Speculative Tail Duplication (SSTD). That is, SSTD splits code and statically renames the registers to allow copies of the same original instruction to operate on different register locations. Accordingly, the race condition is avoided by causing the instructions in different strands to operate on different registers. Unfortunately, SSTD results in exponential code size growth. That is, as more join points are available in a program Control Flow, exponentially more code must be statically duplicated to enable speculative execution.

In contrast, some other systems use Dynamic STD (DSTD). Dynamic STD does not make any copies of nodes or registers operated on by instructions within the nodes. DSTD enables strands belonging to different paths of an if-then-else statement to speculatively execute (e.g., execute before predicate value is known) the same instructions originally residing after the control flow join point, but still represented by the same instance in compiled code. That is, the instruction has one static instance but two (or more) dynamic instances.

Unfortunately, DSTD may create a race condition, where multiple strands may attempt to operate on the same register location. As disclosed herein, the race condition is avoided by using register basing values. Consider, for example, two strands executing the same instruction that operate on the same register. If the instructions are modified such that the register location is not static (e.g., based on a variable register location such as a basing value) the same instructions may operate on different memory locations by virtue of the basing value. The register location is calculated as a sum of the basing value used throughout the strand and a number encoded in the instruction (e.g., the original register location that the instruction would have read and/or operated on). Thus, different dynamic instances of the same instruction executed by different strands use different basing values and, accordingly, access different registers.

Figure 11:
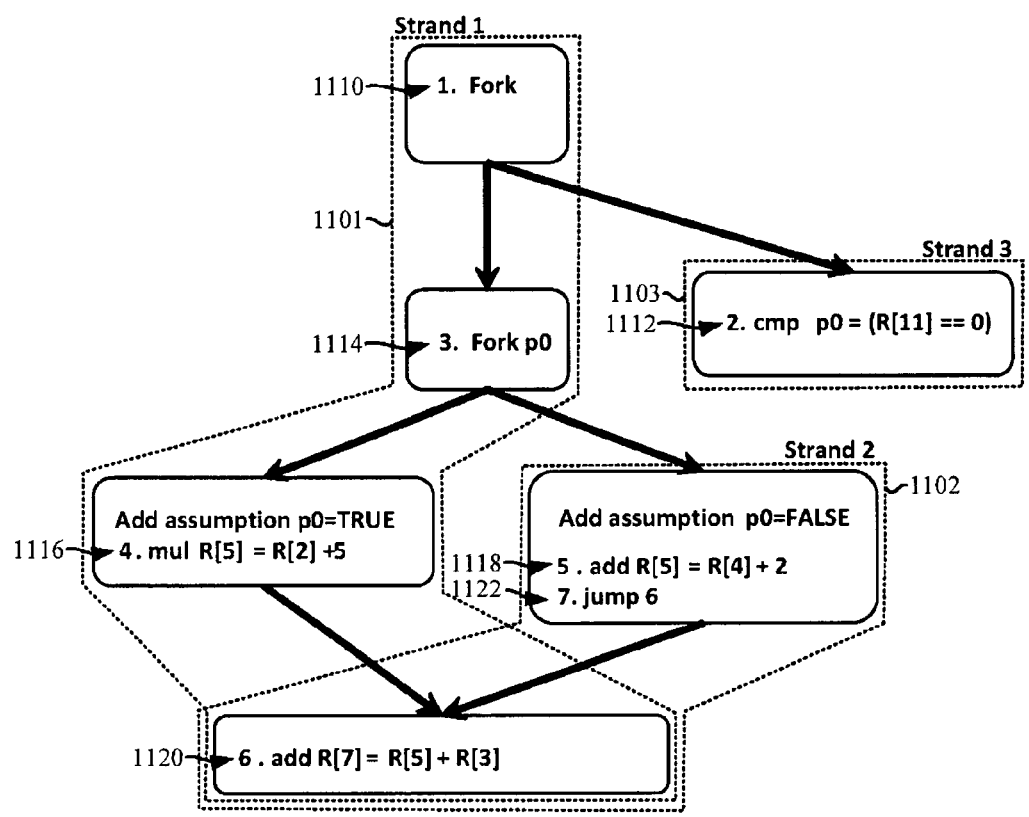
FIG. 11 illustrates example strands for speculative execution of instructions including three strands.

FIG. 11 illustrates example strands for speculative execution of instructions including three strands. In the illustrated example of FIG. 11, three strands 1101, 1102, 1103 are shown. However, any other number of strands may additionally or alternatively be used. In the first example strand 1101, a first instruction 1110 initiates a fork. The fork of the first instruction 1110 instantiates a third strand 1103. A second instruction 1112 is executed in the third strand 1103. In the illustrated example, the second instruction 1112 evaluates a predicate (e.g., P0). In some examples, evaluation of the predicate may not be completed quickly. For example, register eleven may not be immediately available. Upon evaluation of the predicate of the second instruction, the processor 116 may select which register location contains the correct speculatively executed information. Execution of the second instruction is asynchronous with the first strand 1101 and the second strand 1102.

A third instruction 1114 initiates a second fork based on predicate evaluated by the second instruction 1112. A second strand 1102 is instantiated. Control flows to both the first strand 1101 and the second strand 1102. Speculative assumptions are then added to the first strand 1101 and the second strand 1102. The speculative assumptions are placed in the strands 1101, 1102 higher than definitions of registers that may be involved in a race condition. While in the illustrated example, the speculative assumptions are near (e.g., within a few instructions of) the instructions that operate on the registers, they may be made at any other time prior to the definitions of the registers operating on the registers.

In the illustrated example, a fourth instruction 1116 and a fifth instruction 1118 operate on static register locations. In the illustrated example, the fourth instruction 1116 and the fifth instruction 1118 operate on a same register location (e.g., register location R[5]). Operating on the same register creates a race condition where both the first strand 1101 and the second strand 1102 may set the register to a different value. In some examples, setting the register to a different value in different strands may cause a race condition and data corruption.

In the illustrated example, a seventh instruction 1122 instructs the second strand 1102 to re-join with a sixth instruction 1120 (e.g., an instruction in the first strand 1101. The first strand 1101 executes a first dynamic instance of the sixth instruction 1120, while the second strand 1102 executes a second dynamic instance of the sixth instruction 1120. In each dynamic instance, the instructions use the register location defined in the instructions.

Figure 12:
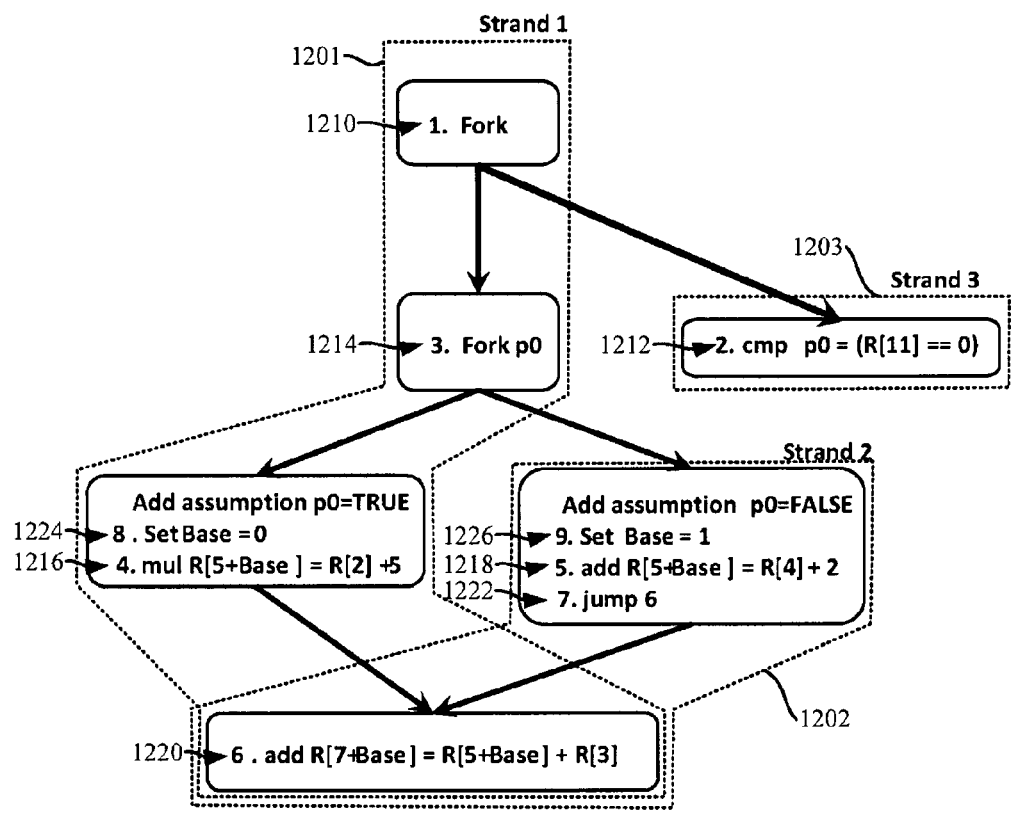
FIG. 12 illustrates example strands for speculative execution of instructions using Dynamic Speculative Tail Duplication (DSTD) in combination with register basing.

FIG. 12 illustrates example strands for speculative execution of instructions using DSTD in combination with register basing. Example register basing disclosed herein sets a location of a register based on a static register basing value assigned at time of compilation. However, it could be dynamically calculated in other examples, so long as correct separation of register locations is achieved. The register basing value is used only by the strands with which it is associated and, accordingly, strands which have different predicate assumptions do not operate on the same register locations.

The illustrated example of FIG. 12 shows an example where strand 1202 is forked by strand 1201 if the assumption of instruction 1212 calculates FALSE. Strand 1201 continues its execution after instruction 1214 if the assumption of instruction 1212 calculates TRUE. However, the example strands may be forked at any other point. Of primary importance is that there are at least two strands with disjoint speculative assumptions that both pass a join point and then reach at least one instruction to be executed in each of the strands.

In the illustrated example of FIG. 12, three strands 1201, 1202, 1203 are shown. However, any other number of strands may additionally or alternatively be used. Each strand 1201, 1202, 1203 represents code to be executed by the processor 116. In the first example strand 1201, a first instruction 1210 initiates a fork. The fork of the first instruction 1210 instantiates a third strand 1203. A second instruction 1212 is executed in the third strand 1203. In the illustrated example, the second instruction 1212 evaluates a predicate (e.g., P0). In some examples, evaluation of the predicate may not be completed quickly. For example, register eleven may not be immediately available. Upon evaluation of the predicate of the second instruction, the processor 116 may select which register location contains the correct speculatively executed information. Execution of the second instruction is asynchronous with the first strand 1201 and the second strand 1202.

A third instruction 1214 initiates a second fork based on predicate evaluated by the second instruction 1212. A second strand 1202 is instantiated. Control flows to both the first strand 1201 and the second strand 1202. Speculative assumptions are then added to the first strand 1201 and the second strand 1202. The speculative assumptions are placed in the strands 1201, 1202 higher than definitions of registers that may be involved in a race condition. While in the illustrated example, the speculative assumptions are near (e.g., within a few instructions of) the instructions that operate on the registers, they may be made at any other time prior to the definitions of the registers operating on the registers.

In the first strand 1201, an eighth instruction 1224 sets a basing value to zero. In the second strand 1202, a ninth instruction 1226 sets a basing value to one (e.g., a value different than the basing value used in the first strand 1201). In the illustrated example, the register basing value is an integer that is set to a different value in each strand. However, any other technique for setting the register basing value may additionally or alternatively be used. For example, techniques such as cluster register basing, statically initializing the register base, dynamically initializing the register base, etc. may be used to set the register basing value. In some examples, the register base may be set implicitly (e.g., without an explicit instruction).

Again, like the speculative assumption, the definition of the basing value need not occur at the beginning of the strand. For example, with respect to the illustrated example of FIG. 12, the fifth instruction 1218 (e.g., "add R[5+Base]=R[4]+2"), may be modified using a basing value (e.g., replaced with the instruction "add R[6]=R[4]+2"). In such an example, the ninth basing instruction 1226 may be executed after the fifth instruction 1218, because it still occurs before the join point (represented by the sixth instruction 1220).

In the illustrated example, a fourth instruction 1216 and a fifth instruction 1218 operate on register locations dynamically calculated using the basing value local to each strand. If, for example, the fourth instruction 1216 and the fifth instruction 1218 were not based (e.g., not operating on a dynamically calculated register location), the fourth instruction 1216 and the fifth instruction 1218 might operate on the same register location. However, as a result of the different basing values and the dynamic calculation of the register location, the fourth instruction 1216 and the fifth instruction 1218 operate on different register locations.

In the illustrated example, a seventh instruction 1222 instructs the second strand 1202 to re-join with a sixth instruction 1220 (e.g., an instruction in the first strand 1201. The first strand 1201 executes a first dynamic instance of the sixth instruction 1220, while the second strand 1202 executes a second dynamic instance of the sixth instruction 1220. In each dynamic instance, the register basing value is associated with the strand (e.g., the first strand 1201 or the second strand 1202). Accordingly, the sixth instruction 1220 executed by the first strand 1201 writes to a first register location, while the sixth instruction 1220 executed by the second strand 1202 writes to a second register location.

While the illustrated example of FIG. 12 shows example instructions executed by three strands 1201, 1202, 1203, any number of strands may additionally or alternatively be used. Furthermore, multiple levels of predicates may be used. For example, an if-statement within an if-statement, may result in multiple levels of predicates that may be executed as multiple speculative strands.

In the illustrated example of FIG. 12, dynamic speculative tail the duplication (DSTD) is used in combination with register basing to increase performance and/or ensure that that a race condition does not occur. That is, the compiler 110 compiles the executable code such that multiple strands execute dynamic copies of the same instruction (e.g., the fifth instruction 1217). While DSTD itself does not eliminate race conditions, it does prevent code growth while enabling speculative execution. Register basing is used to eliminate race conditions by dynamically setting register locations to be operated on by the dynamic instances of instructions used in DSTD approach.

Figure 13:
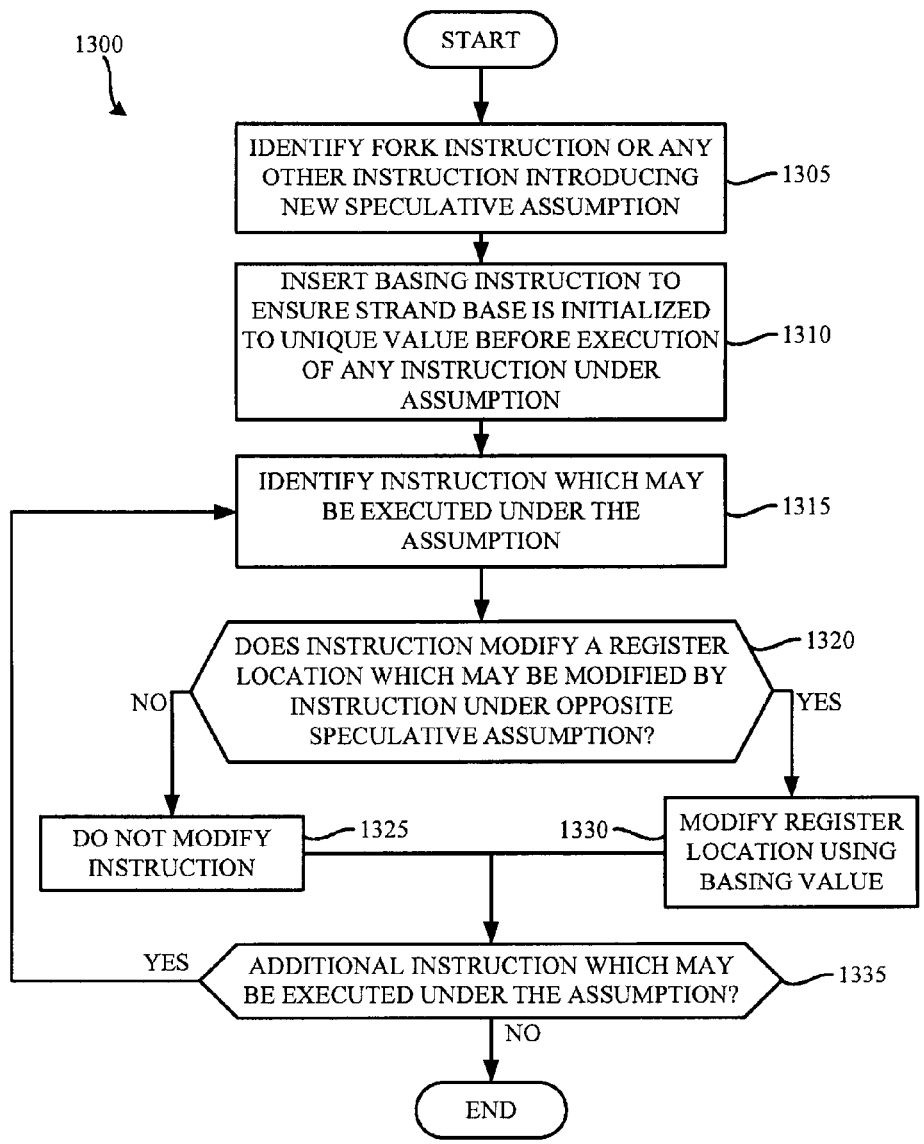
FIG. 13 is a flowchart representative of example machine-readable instructions 1300 that may be executed to implement the example compiler 110 of FIG. 1.

FIG. 13 is a flowchart representative of example machine-readable instructions 1300 that may be executed to implement the example compiler 110 of FIG. 1. The example process 1300 of the illustrated example of FIG. 13 begins when the compiler 110 begins compiling the un-compiled code 112 of FIG. 1. The tail duplicator 180 identifies strands and/or control join points in instructions (block 1305). For example, the tail duplicator identifies a forking instruction in the first and third instructions 1210, 1214 of FIG. 12. However, the tail duplicator 180 may identify strands in any other fashion. For example, the tail duplicator 180 may inspect the un-compiled code 112 and/or the compiled code 114 for instructions that commonly result in multiple speculative assumptions and/or strands such as, for example, an if-statement, an else-statement, a switch-case statement, etc.

In the illustrated example, the tail duplicator 180 inserts a basing instruction that sets a register basing value that is local to each strand (block 1310). In the illustrated example, the basing instruction is inserted in such a way to ensure a local register base is initialized into a value that is unique for a given speculative assumption before execution of any instruction speculative by this assumption. However, in some examples, the register basing value is dynamically allocated to the strand and, accordingly, no basing instruction is entered. This basing instruction enables the DSTD approach to create dynamic instances of instructions, but use register locations that do not result in race conditions. In the illustrated example, the register basing value is an integer that is set to a different value in each strand. However, any other technique for setting the register basing value may additionally or alternatively be used. For example, techniques such as cluster register basing, statically initializing the register base, dynamically initializing the register base, etc. may be used to set the register basing value.

The tail duplicator identifies an instruction within a strand (block 1315). The tail duplicator determines whether the instruction reads and/or modifies a register location modified by an instruction, which may be asynchronously executed under an opposite speculative assumption (block 1320). In some examples, the tail duplicator 180 scans through the instructions, executed under an opposite speculative assumption, to determine whether a same register location is modified. If the register location is not modified under an opposite speculative assumption (block 1320), the tail duplicator does not modify the instruction (block 1325). That is, the tail duplicator 180 prevents modification of instructions that do not modify register locations modified by instructions under an opposite speculative assumption. If the register location is modified under an opposite speculative assumption (block 1320), the tail duplicator modifies the register location of the instruction using a variable representing the register basing value associated with the assumption (block 1330). With respect to the illustrated example of FIG. 12, the fourth instruction 1216, the fifth instruction 1218, and the sixth instruction 1220 are modified such that they operate on and/or read from register locations that are dynamically calculated using the register basing value at a time of execution.

The tail duplicator 180 then determines if additional instructions which may be executed under the same assumption exist (block 1335). If additional instructions exist (block 1335), the tail duplicator identifies the instructions (block 1315), determines whether they should be modified (block 1320), and modifies them appropriately (blocks 1325, 1330). If no additional instructions which may be executed under the same assumption exist (block 1335), the process 1300 terminates.

As disclosed herein, register basing is used to avoid race conditions and/or to increase performance of speculatively executed strands. Existing architectures such as, for example, superscalar and/or VLIW architectures do not combine asynchronous execution (e.g., multiple strands for speculative execution) with dynamic register basing. Instead, in existing architectures, a likelihood of each branch is predicted and only the predicted branch is executed. Examples disclosed herein organize strands in such a way to execute instructions after a control flow join point in more than one dynamic instance having different speculative assumptions. Based on a predicate, a strand associated with the correct speculative assumption may be selected. Conversely strand(s) associated with incorrect speculative assumptions may be ignored. In some examples, the predicate is asynchronously determined with relation to the strands executing based on the speculative assumptions. That is, the predicate is executed (e.g., determined) relative to the strands executing based on different speculative assumptions.

Figure 14:
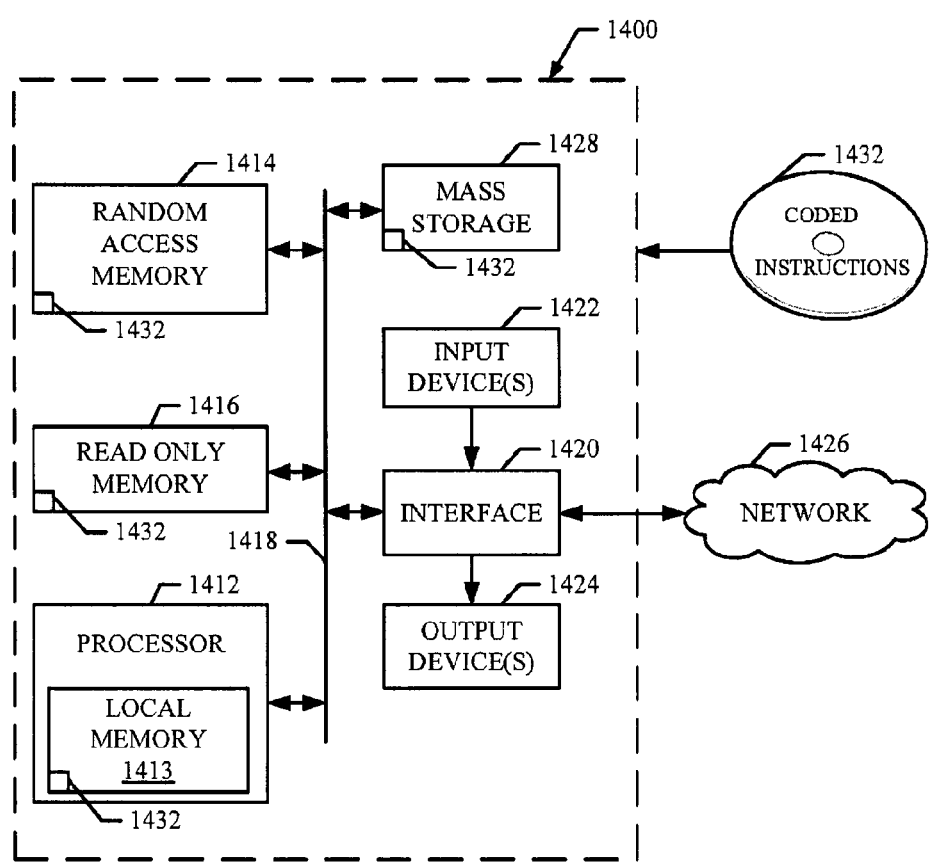
FIG. 14 is a block diagram of an example processor platform capable of executing the example machine-readable instructions of FIGS. 5, 10, and/or 13 to implement the example compiler of FIG. 1.

FIG. 14 is a block diagram of an example processor platform 1000 capable of executing the instructions of FIGS. 5, 10, and/or 13 to implement the compiler 110 of FIG. 1. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1420 of the illustrated example, thus, typically includes a graphics driver card.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 5, 10, and/or 13 may be stored in the mass storage device 1428, in the volatile memory 1414, in the non-volatile memory 1416, and/or on a removable tangible computer readable storage medium such as a CD or DVD.

Methods to compile instructions are disclosed herein. An example method includes identifying a predicate dependency between a first compiled instruction and a second compiled instruction at a control flow join point, the second compiled instruction having different speculative assumptions corresponding to how the second compiled instruction will be executed based on an outcome of the first compiled instruction. A first strand is organized to execute a first instance of the second compiled instruction corresponding to a first one of the speculative assumptions, and a second strand to execute a second instance of the second compiled instruction corresponding to a second one of the speculative assumptions which is opposite to the first one of the speculative assumptions. The first instance of the second compiled instruction and the second instance of the second compiled instruction are executed in an asynchronous manner relative to each other and/or to the first compiled instruction.

In examples disclosed herein, the predicate dependency is identified within compiled machine-readable instructions.

In examples disclosed herein, the method further comprises preventing modification of a third instruction in the first strand if the third instruction does not operate on a register location operated on by the second strand.

In examples disclosed herein, the first instance of the second compiled instruction operates on a first register location, and the second instance of the second compiled instruction operates on a second register location different from the first register location.

In examples disclosed herein, the first register location is determined at a time of execution.

In some examples, the first register location is determined based on a register basing value.

Apparatus to compile instructions is disclosed herein. An example apparatus includes a scheduler to assign different execution priorities to different strands of corresponding loops identified during a compilation phase, the different execution priorities to facilitate execution of the strands by a processor based on the different priorities being located in compiled instructions corresponding to the different strands.

In some examples, the execution priorities are integer values.

In some examples, the apparatus further includes a strand reducer to combine a first strand with a second strand to form a third strand, the first strand and the second strand dependent on a fourth strand, the first and second strands not dependent on one another.

In some examples, the apparatus further includes a timing analyzer to analyze timings of compiled instructions within the strands, the strand reducer to arrange compiled instructions based on the timing analysis.

In some examples, the apparatus further includes a tail duplicator to detect that operations across the different strands operate on a first register location, and to modify the register location so that one of the different strands operates on a second register location different from the first register location.

Example tangible machine readable storage mediums comprising machine-readable instructions are disclosed herein. An example tangible machine readable storage medium comprises instructions which, when executed cause a machine to at least identify a predicate dependency between a first compiled instruction and a second compiled instruction at a control flow join point, the second compiled instruction having different speculative assumptions corresponding to how the second compiled instruction will be executed based on an outcome of the first compiled instruction. A first strand is organized to execute a first instance of the second compiled instruction corresponding to a first one of the speculative assumptions, and a second strand to execute a second instance of the second compiled instruction corresponding to a second one of the speculative assumptions opposite to the first one of the speculative assumptions. The first instance of the second compiled instruction and the second instance of the second compiled instruction are executed in an asynchronous manner relative to each other and/or to the first compiled instruction.

In examples disclosed herein, the predicate dependency is identified within compiled machine-readable instructions.

In examples disclosed herein, the example instructions, when executed, cause the machine to prevent modification of a third instruction executing under the first one of the speculative assumptions, if the third instruction does not operate on a register location operated on by any instruction executing under the second one of the speculative assumptions.

In examples disclosed herein, the first instance of the second compiled instruction operates on a first register location, and the second instance of the second compiled instruction operates on a second register location different from the first register location.

In examples disclosed herein, the first register location is determined at a time of execution.

In examples disclosed herein, wherein the first register location is determined based on a register basing value.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The invention claimed is:

1. A method to compile instructions, the method comprising:
    identifying a predicate dependency between a first compiled instruction and a second compiled instruction at a control flow join point, the second compiled instruction having different speculative assumptions corresponding to how the second compiled instruction will be executed based on an outcome of the first compiled instruction;
    organizing a first strand to execute a first instance of the second compiled instruction corresponding to a first one of the speculative assumptions, and a second strand to execute a second instance of the second compiled instruction corresponding to a second one of the speculative assumptions opposite to the first one of the speculative assumptions;
    preventing modification of a third instruction executing under the first one of the speculative assumptions, if the third instruction does not operate on a register location operated on by any instruction executing under the second one of the speculative assumptions; and
    executing the first instance of the second compiled instruction and the second instance of the second compiled instruction in an asynchronous manner relative to each other and to the first compiled instruction.

2. A method as defined in claim 1, wherein the predicate dependency is identified within compiled machine-readable instructions.

3. A method as defined in claim 1, wherein the first instance of the second compiled instruction operates on a first register location, and the second instance of the second compiled instruction operates on a second register location different from the first register location.

4. The method as described in claim 3, wherein the first register location is determined at a time of execution.

5. The method as described in claim 3, wherein the first register location is determined based on a register basing value.

6. An apparatus to compile instructions, the apparatus comprising:
    a scheduler to assign different execution priorities to different strands of corresponding loops identified during a compilation phase, the different execution priorities to facilitate execution of the different strands by a processor based on the different priorities being located in compiled instructions corresponding to the different strands; and
    a tail duplicator to detect a first operation in a first one of the different strands that executes on a first register location and detect a second operation in a second one of the different strands that executes on the first register location, the tail duplicator to prevent modification of a third operation in at least one of the first one or the second one of the different strands if the third operation does not operate on the first register location.

7. An apparatus as defined in claim 6, wherein the execution priorities are integer values.

8. An apparatus as defined in claim 7, further comprising a strand reducer to combine the first strand of the different strands with the second strand of the different strands to form a third strand, the first strand and the second strand dependent on a fourth strand, the first and second strands not dependent on one another.

9. An apparatus as defined in claim 8, further comprising a timing analyzer to analyze timings of compiled instructions within the different strands, the strand reducer to arrange compiled instructions based on the timing analysis.

10. An apparatus as defined in claim 6, wherein the tail duplicator is to modify the second operation so that the second one of the different strands operates on a second register location different from the first register location.

11. An apparatus as defined in claim 10, wherein the second register location is dynamically determined at a time of execution.

12. A tangible machine readable storage medium comprising instructions which, when executed cause a machine to at least:
- identify a predicate dependency between a first compiled instruction and a second compiled instruction at a control flow join point, the second compiled instruction having different speculative assumptions corresponding to how the second compiled instruction will be executed based on an outcome of the first compiled instruction;
- organize a first strand to execute a first instance of the second compiled instruction corresponding to a first one of the speculative assumptions, and a second strand to execute a second instance of the second compiled instruction corresponding to a second one of the speculative assumptions opposite to the first one of the speculative assumptions;
- prevent modification of a third instruction executing under the first one of the speculative assumptions, if the third instruction does not operate on a register location operated on by any instruction executing under the second one of the speculative assumptions; and
- execute the first instance of the second compiled instruction and the second instance of the second compiled instruction in an asynchronous manner relative to the first compiled instruction.

13. A machine-readable medium as defined in claim 12, wherein the predicate dependency is identified within compiled machine-readable instructions.

14. A machine-readable medium as defined in claim 12, wherein the first instance of the second compiled instruction operates on a first register location, and the second instance of the second compiled instruction operates on a second register location different from the first register location.

15. A machine-readable medium as defined in claim 14, wherein the first register location is determined at a time of execution.

16. A machine-readable medium as defined in claim 14, wherein the first register location is determined based on a register basing value.

* * * * *